May 13, 1958 M. W. YOUNG 2,834,372
VALVE CONSTRUCTION
Filed June 8, 1955
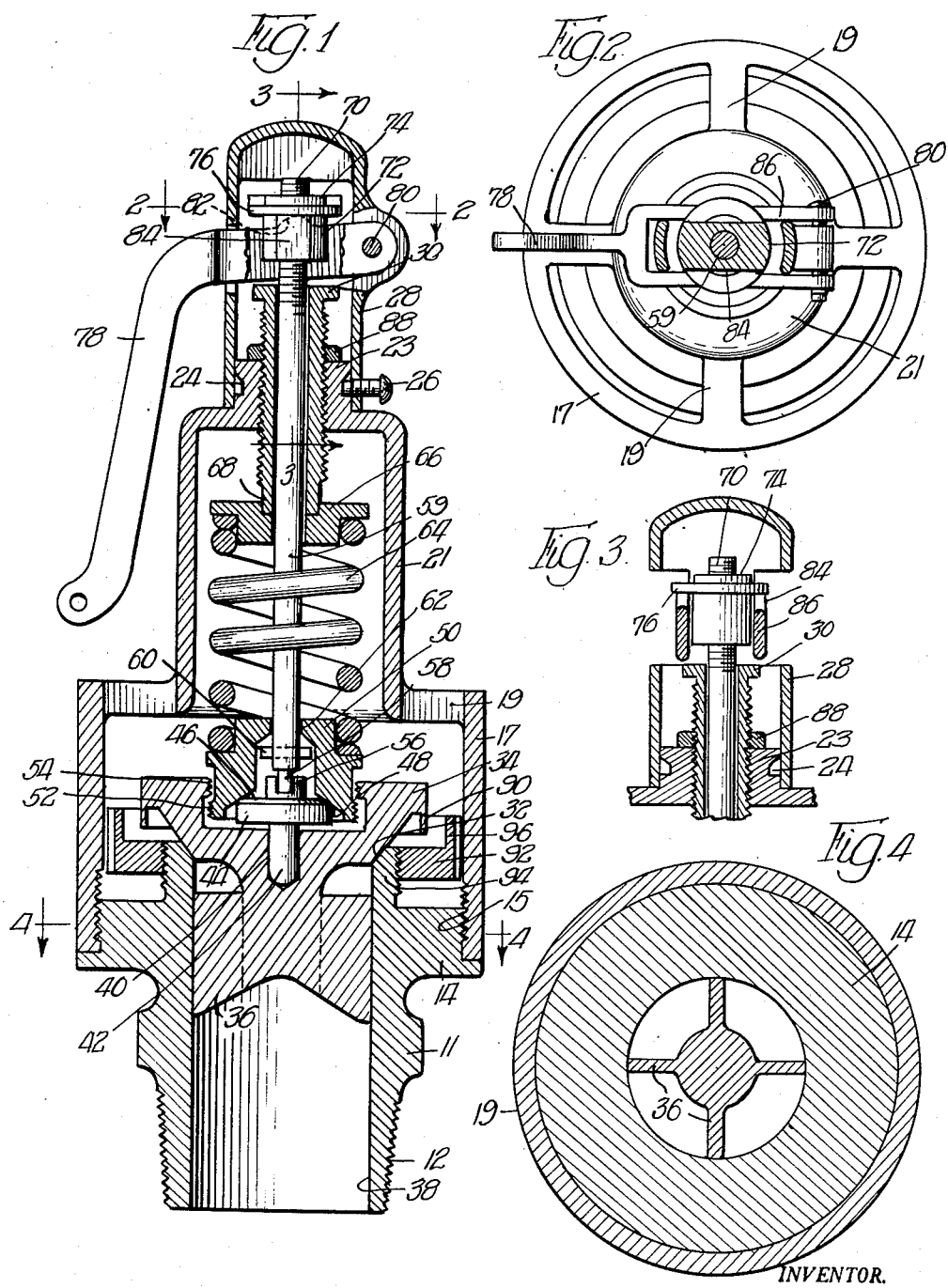
INVENTOR.
Maurice W. Young,
BY
ATTYS.

United States Patent Office 2,834,372
Patented May 13, 1958

2,834,372

VALVE CONSTRUCTION

Maurice W. Young, Fort Wayne, Ind., assignor to Kunkle Valve Company, Fort Wayne, Ind., a corporation of Indiana Application June 8, 1955, Serial No. 514,042

5 Claims. (Cl. 137—478)

This invention relates to a new and improved valve and more particularly to a spring loaded pressure relief valve or safety valve especially adapted for easy adjustment and manual test.

Valves of this character are used in many systems as a safety measure and serve to automatically open to relieve pressure after the fluid pressure on the inner side of the valve has reached a predetermined point. For many uses it is important that the valve be fluid tight until the predetermined pressure has been reached. It is also important that the spring loading be readily adjustable and that when once adjusted the adjustment be maintained with substantially equal pressure throughout the contact area between the valve and valve seat. Among the difficulties with usual types of valves is the fact that the valve may be non-uniformly loaded about its periphery when the ends of the spring are not formed absolutely flat and parallel. Buckling of the spring upon being stressed to apply the load may also result in an eccentric thrust upon the valve proper.

It is an object of the present invention to provide a new and improved spring loaded safety relief valve.

It is a further object to provide such a valve in which the working parts are self-aligning throughout the opening and closing cycle of the valve operation.

It is another object to provide a valve construction in which compensation for any spring characteristic which may cause a tendency for uneven or eccentric distribution of spring thrust is automatically obtained.

It is also an object to provide a valve including a simple construction in which the spring thrust is transmitted to the valve disc at a point below the seating line of the disc upon the valve seat.

It is an additional object to provide a relief valve construction including a captive floating spindle whereby friction between moving parts is minimized.

It is a further object to provide a valve of this character having a simplified coupling between the spindle and valve disc.

It is another object to provide such a valve provided with an adjustable huddling chamber to control the valve blowdown.

It is also an object to provide a valve construction of this character including a lever and spindle nut assembly for manual operation of the valve, wherein the relationship of the spindle nut and lever may be readily adjusted.

It is an additional object to provide a relatively simple valve construction adapted for commercial production and use.

Other and further objects will appear as the description proceeds.

I have shown certain preferred embodiments of my invention in the accompanying drawings in which—

Figure 1 is a vertical section through the valve;

Figure 2 is a horizontal cross section taken on line 2—2 of Figure 1;

Figure 3 is a fragmentary vertical section taken on line 3—3 of Figure 1; and

Figure 4 is a horizontal cross section taken on line 4—4 of Figure 1.

As shown in the drawings, the valve construction comprises a body member 11 having its lower portion threaded at 12 for connection to any piping or other portion of a pressure system to be controlled by the valve. The upper portion of the body member is provided with a circumferential shoulder 14 threaded at 15 to receive the cap or housing member 17. This member 17 comprises a lower cylindrical wall portion connected by inwardly extending arms 19 with an inner cylindrical upper portion 21. This upper portion 21 terminates at a reduced extension 23 having a circumferential recess 24 to receive a set screw 26. This set screw 26 passes through a hood 28 to retain that hood in position on the upper part of the cap or housing member. The upper reduced extension portion 23 of the housing member is internally threaded to receive the pressure adjusting screw sleeve 30.

The body member 11 is provided with a valve seat 32 to receive a mating portion of the valve disc 34. As shown in cross section in Figure 4, the lower portion of the valve disc is provided with radially extending fins 36 interfitting with the tubular inner surface 38 of the body member 11. This interfit serves to guide the valve disc 34 in its movement upwardly and downwardly in operation. The valve disc 34 is provided, in its upper face, with an axially located recess 40 into which is fitted a pressure pin 42. This pin 42 has an upper circumferential shoulder portion 44 having a chamfered face 46 against which thrusts a similar surface 48 on the bottom spring thrust member 50. This thrust member 50 has around its lower outer circumference a threaded portion 52 which may be threaded through a similar external thread 54 formed on the upper portion of the valve disc 34.

The upper portion of the pin 42 is provided with a transverse slot at 56 into which loosely fits the transverse tongue 58 carried by the lower end of the spindle 59. This lower end of spindle 59 also carries a transverse pin 60 adapted to engage under an inwardly extending shoulder 62 formed on member 50. The loading spring 64 has its lower end bearing against the lower spring thrust member 50 while its upper end is engaged by the top spring thrust plate 66. This plate 66 has an inner shoulder to receive the lower end 68 of the pressure adjusting sleeve 30.

The upper end of the spindle 59 is threaded at 70 to receive the nut 72 which has an upper laterally extending flange 74. The washer 76 is fitted under flange 74 and is rotatable relative to the nut 72. The manually operable lever 78 is pivoted on a pin 80 which is carried in the cap 28. This lever 78 is provided with rounded contact surfaces 82 adapted to engage the underface of the washer 76. As best shown in Figure 3, the nut 72 has flat faces 84 adapted to engage the inner faces of the spaced arms 86 of the lever 78 so as to prevent rotation of the nut 72 once the parts are locked in assembled relation. A lock nut 88 is provided on sleeve 30, the lock nut fitting against the top of the reduced extension 23 of the housing member 17 so as to maintain the pressure adjustment of the loading spring 64.

The valve disc 34 is provided with a downwardly extending circumferential flange 90 extending from its outer periphery. An adjustable collar 92 is threaded on the upper portion 94 of the body member 11, this collar having an upwardly extending circumferential flange 96. This flange 96 surrounds and is spaced from the downwardly extending flange 90 of the valve disc 34.

The collar 94 may be adjusted upwardly or downwardly to vary the relationship between flanges 90 and 96 to thus provide an adjustable huddling chamber.

In assembling the valve it will be apparent that the parts are brought to the position shown in cross section in Figure 1. This is accomplished by screwing the threaded portion 52 of thrust member 50 through the threaded portion 54 of the valve disc 34. The operating pressure of the valve is adjusted by screwing down the sleeve 30 and locking it in adjustment by the lock nut 88. This applies the desired load to spring 64. The other parts, including the cap 28 and manual operating lever 78, may then be assembled as shown with the set screw 26 loose and permitting rotation of the cap 28. The cap 28 may then be rotated together with the lever 78, which lever causes rotation of the nut 74 on spindle 59. The cap and lever assembly is rotated until the washer 76 below the flange 74 of the nut 72 bears firmly on the rounded contact surfaces 82 of the lever 78. This thrust will lift the spindle 59 so that its lower cross pin 60 bears against the shoulder portion 62 of the lower spring thrust member 50. Further, rotation of the nut 72 will be resisted by the full pressure of the spring 64. During adjustment the spindle 59 will be prevented from rotation by the interfitting of the tongue 58 in the slot 56 in the pressure pin which is held by the spring loading.

The normal position of the parts will be reached by backing up the lever 78 and cap 28 slightly from the point where the resistance of spring 64 is apparent. The parts may be retained in this adjusted position by tightening the set screw 26.

It will be apparent that when the fluid pressure in the tubular central opening 38 in the member 11 is adequate to overcome the spring loading by spring 64 the valve disc 34 will be lifted so that the valve disc is moved away from the valve seat 32. The fluid will then escape through the valve and through the huddling chamber and pass out from the housing 17 between the arms 19. During this upward movement the spring 64 will be compressed by a thrust transmitted through the pin 42 and shoulder 46 to the underface 48 of the lower spring thrust member 50. The spindle 59 will be moved upwardly with the lower spring thrust member, but will have no part in the automatic operation of the relief valve.

When it is desired to manually test or operate the valve, the lever 78 will be swung outwardly and upwardly about its pivot pin 80. The two thrust surfaces 84 will bear against the washer 76 to thrust it against the flange 74 of nut 72. This will move the spindle 59 upwardly. The cross pin 60 carried by the lower end of the spindle 59 will engage the shoulder 62 on the lower spring thrust member 50 to move that member upwardly against the spring pressure. The threaded portion 52 on member 50 will engage the lower face of the threaded portion 54 on valve disc 34 to lift the valve from its seat. The spindle 59 is effective in this manual operation yet is independent of the parts causing operation of the valve automatically as a relief valve so that it cannot cause friction to vary the automatic operation.

Due to the construction, including the pressure pin 42 with its point bearing in the valve disc in a plane below the plane of the valve seat, the transmission of any lateral thrust from the loading spring 64 to the valve disc is greatly minimized. A further important element in the construction is the floating thrust contact between the bottom spring thrust member 50 and the shouldered upper portion 44 of the pressure pin 42. These several features combine to make a valve construction in which non-parallel end faces of the thrust spring or even eccentricity of that spring or a lateral bowing of the spring under pressure will not materially affect the uniform seating of the valve disc 34 and the efficient functioning of the relief valve at the pressure for which it may be set.

The construction permits the adjustment of the nut 72 relative to the manual lever 78 very simply and easily after all parts are assembled and this adjustment is maintained by the set screw 26.

While I have shown certain preferred embodiments of my invention these are to be understood to be illustrative only as it is capable of variation to meet differing conditions and requirements and I contemplate such modifications as come within the spirit and scope of the appended claims.

I claim:

1. A relief valve comprising a body member having a valve seat carried thereby, a valve disc slidably fitted in the body member and having a portion adapted to engage the valve seat, the valve disc having a thrust seat formed therein upon its axis, a pressure pin having a portion adapted to engage the disc thrust seat, a bottom spring thrust collar having a universally tiltable engagement with the pressure pin, a pressure spring having its lower end engaging the thrust collar, a floating spindle in alignment with the pressure pin and extending upwardly through the bottom spring thrust collar and spring, means interconnecting the bottom thrust collar and valve disc and means interconnecting the spindle and bottom thrust collar whereby an upward movement of the spindle will lift the valve disc, means for raising the spindle and adjustable means for supplying a thrust against the upper end of the spring, said adjustable means being supported from the body member.

2. A relief valve comprising a body member having a valve seat carried thereby, a valve disc slidably fitted in the body member and having a portion adapted to engage the valve seat, a pressure pin fitted into the upper face of the valve disc, a bottom spring thrust collar having a tiltable thrust engagement with the pressure pin and having a portion loosely fitting under a portion of the valve disc, a pressure spring having its lower end engaging the thrust collar, a top thrust collar engaging the upper end of the spring, a floating spindle extending up through the spring and thrust collars, said spindle having means for engaging the bottom thrust collar to lift the bottom thrust collar and valve disc upon upward movement of the spindle, means for raising the spindle and a pressure adjusting screw member supported above the body member and engaging the upper portion of the top thrust collar.

3. A relief valve comprising a body member having a valve seat, a valve disc, pressure means including a spring for seating the valve disc on the valve seat, a spindle having a loose connection with the valve disc whereby upward movement of the spindle lifts the valve disc, a second connection between the spindle and valve disc whereby pressure of the spring frictionally resists rotation of the spindle relative to the valve disc, the upper end of the spindle being threaded, a nut screwed on the threaded portion of the spindle, said nut having a flat lateral face, a hood rotatably supported from the housing, a lever pivoted in the hood, a portion of the lever engaging the flat face of the nut whereby rotation of the lever and hood rotate the nut, the nut having a shoulder extending above the upper face of the lever, and means for locking the hood in adjusted rotary position.

4. A relief valve comprising a body member having a valve seat, a valve disc having a seat engaging portion, a pressure pin engaging the valve disc, a bottom spring thrust member engaging the pressure pin to transmit downward thrust and having a loose interfit with the valve disc to lift the disc, adjustable means for applying spring pressure to the bottom spring thrust member, a spindle having a portion extending into the bottom spring thrust member, said spindle portion having lateral extensions adapted to engage and lift the bottom spring thrust member, means for preventing rotation of the spindle, a nut adjustably threaded upon the upper portion of the spindle, and a lever pivotally supported from the housing, said lever being adapted to thrust against the nut to lift the spindle, bottom spring thrust member and valve disc.

5. A relief valve comprising a body member having a valve seat, a valve disc having a seat engaging portion, a pressure pin engaging the valve disc, a bottom spring thrust member engaging the pressure pin to transmit downward thrust and having a loose interfit with the valve disc to lift the disc, adjustable means for applying spring pressure to the bottom spring thrust member, a spindle having a portion extending into the bottom spring thrust member, said spindle portion having lateral extensions adapted to engage and lift the bottom spring thrust member, means for preventing rotation of the spindle, a housing secured to the body member and extending upwardly therefrom, said housing having a reduced upper portion with a hood rotatably secured thereto, the spindle having an upper threaded portion extending into the hood, a nut fitted on said threaded portion, the nut having a flat lateral face and a laterally extending flange, a lever pivoted in the hood and having a portion extending adjacent the flat lateral face of the nut and below the laterally extending flange of the nut, whereby rotation of the lever and hood adjusts the nut upon the spindle, and means for locking the hood against rotation.

References Cited in the file of this patent

UNITED STATES PATENTS

| | | |
|---|---|---|
| 871,775 | Blanchard | Nov. 26, 1907 |
| 1,648,124 | Hopkins | Nov. 8, 1927 |